S. P. Cole,

Pessary,

No. 78,431. Patented June 2, 1868.

Witnesses
Theo Tusche
W. Trewin

Inventor
S. P. Coles
Per Munn & Co
Attorneys

United States Patent Office.

S. P. COLE, OF JANESVILLE, WISCONSIN.

Letters Patent No. 78,431, dated June 2, 1868.

IMPROVEMENT IN UTERINE SUPPORTERS.

The Schedule referred to in these Letters Patent and making part of the same.

TO ALL WHOM IT MAY CONCERN:

Be it known that I, S. P. COLE, of Janesville, in the county of Rock, and State of Wisconsin, have invented a new and improved Uterine Supporter; and I do hereby declare that the following is a full, clear, and exact description thereof, which will enable others skilled in the art to make and use the same, reference being had to the accompanying drawings, forming part of this specification.

Figure 1:
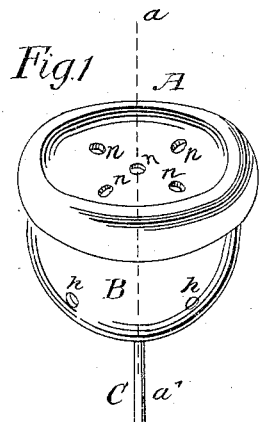

Figure 1 is a perspective view of the supporter.

Figure 2:
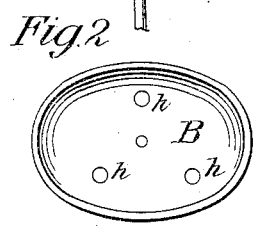
Figure 3:
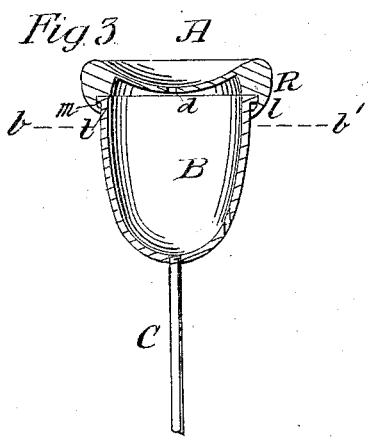

Figure 2 exhibits a horizontal section of the same through the line $b\ b$, fig. 3.

Figure 3 exhibits a vertical section of the supporter through the line $a\ a'$, fig. 1.

Similar letters of reference indicate corresponding parts.

The nature of this improvement consists in the attachment of a soft rubber cushion to a cup, and the elliptical form of the cushion and cup, hereinafter more explicitly described.

In figs. 1 and 3, A is the cushion, B the cup, and C the silver wire supporting the whole.

The cup B is elliptical, as shown by its section in fig. 2. It has a flange or lip, $l$, for securing the cushion A, which is composed of a ring, R, and a head or diaphragm, $d$, forming part of the ring, and attached as shown in figs. 1 and 2. This diaphragm is a thin sheet of soft rubber, and of the same quality as the ring of which it forms a part.

The cup B is hard rubber, or other equivalent material, and has perforations $h\ h\ h$, for the escape of fluids. Attached to its vertex is a silver wire, C, which is connected with the exterior devices, devices for maintaining the same in proper position. This cup is surmounted with a soft rubber ring, R, which is elliptical, its lateral diameter being the greatest. This ring is made with a slight groove, $m$, around its interior surface, for the purpose of clasping firmly over lip $l$ of the cup B, thus uniting the cup and ring securely by the contractile force of the soft rubber.

Attached to and forming a part of the ring is a thin diaphragm, of soft rubber, perforated for the escape of fluids, as shown at $n\ n\ n$, fig. 1, the perforations being of any requisite number. The diaphragm $d$ may be separate, and drawn over the outside of the ring R, thence under, and clasped by the ring against the lip $l$, or it may form a continuous part of the ring.

The soft rubber ring and its diaphragm form a yielding cushion for supporting the uterus; and when the cup B is in position, the neck of the uterus rests on the ring and its diaphragm, and the greater yielding nature of the latter causes it to accommodate the downward pressure of the uterus in a greater degree than the ring to which it is attached, thus forming a concave cushion, of an elliptical perimeter, peculiarly adapted to the form of the uterus, for the same is, after impregnation, of an elliptical form, that is, the lateral diameter is greater than the vertical diameter.

The ring and its diaphragm, which latter should be of the thinnest quality, forms a shallow elliptical cup-shaped cushion, capable of being made deeper by the pressure upon it, and protects the irritable or diseased organ from the pernicious irritation of the hard rubber cup, thus differing essentially and advantageously from those supporters heretofore known or used, as will be more fully set forth.

Those uterine supporters upon which mine is an improvement are Dake and Hockert's, February 16, 1864, (No. 41,607,) D. Dodge's, May 14, 1867, (No. 64,644,) and Thompson's, and are liable to the following serious objections:

Dake and Hockert's supporter is a hard rubber cup, with no yielding devices whatever, thus rendering it irritating to the organ. Its want of elasticity occasions a shock to the uterus, by any inadvertent jolt or sudden step of the patient. Its circular form is not adapted to that of the uterus, for the reason before explained.

Dodge's supporter, being a circular cup, containing a sponge, is answerable to the same objections as the above, the rim of the cup presenting an irritating surface, while the sponge retaining a portion of the secretions from the organ, forms an additional objection.

Thompson's supporter is provided with a hard rubber ring, not supported centrally, as the others, but at the edge and the rim impinging upon the parts, causes irritation. This ring, besides possessing the objections due to its hardness, often permits the lower portion of the uterus to descend through it, and hang congested, and almost in a strangulated condition, so far as its circulation is concerned.

My improved supporter being free from all of these important objections, is thus an instrument more perfectly adapted to the office demanded of uterine supporters.

I claim as new, and desire to secure by Letters Patent—

The uterine supporter, formed by the combination of the soft rubber cushion A, of elliptical form, the cup B, soft rubber ring R, and soft rubber diaphragm d, substantially as herein shown and described, for the purpose specified.

S. P. COLE.

Witnesses:
S. G. BAILEY,
S. FOORD, Jr.